Figure 3:
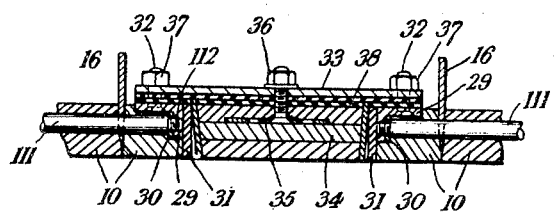

Feb. 20, 1951　　　　F. McINTYRE　　　　2,542,778
RUBBER DRUM FOR BALL MILLS, PEBBLE
MILLS, AND LIKE MACHINES
Filed Sept. 13, 1945　　　　3 Sheets-Sheet 1
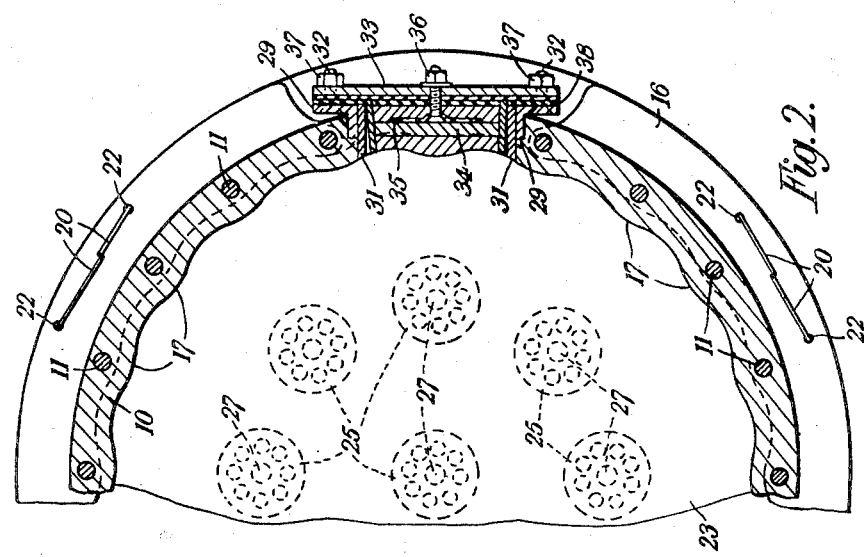
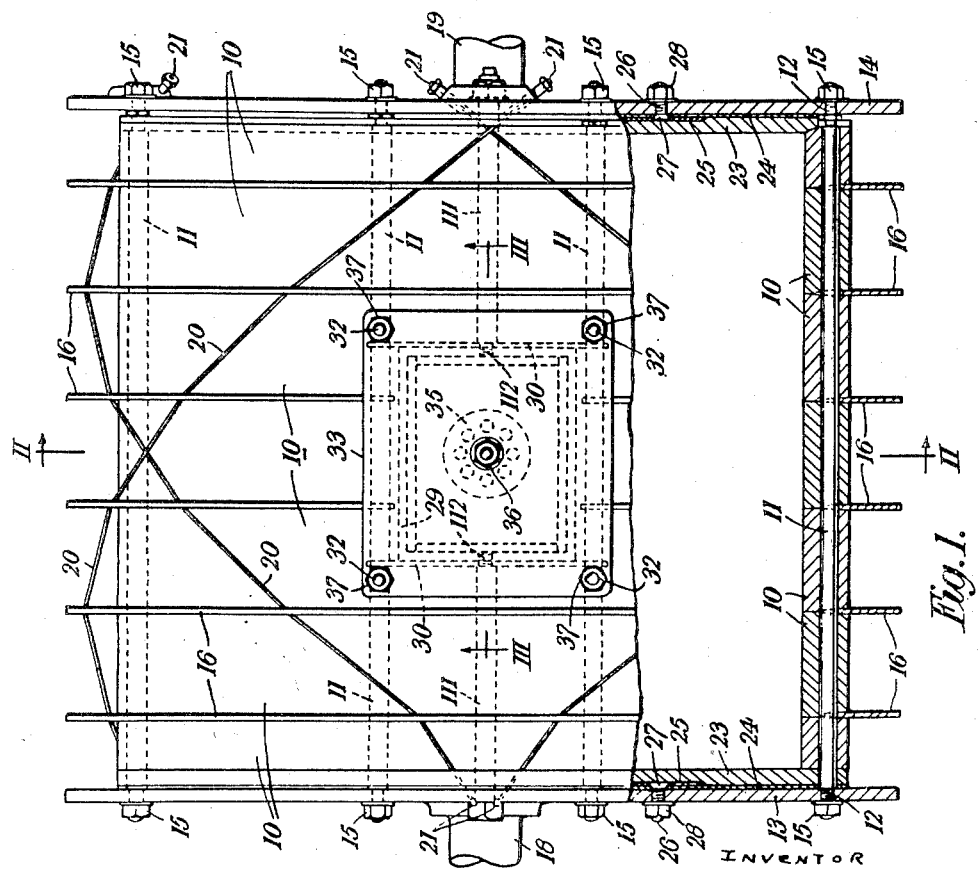
INVENTOR
Frank McIntyre
By Watson, Cole, Grindle & Watson Feb. 20, 1951 F. McINTYRE 2,542,778
RUBBER DRUM FOR BALL MILLS, PEBBLE
MILLS, AND LIKE MACHINES
Filed Sept. 13, 1945 3 Sheets-Sheet 2

INVENTOR
Frank McIntyre
By Watson, Cole, Grindle &
Watson

Feb. 20, 1951          F. McINTYRE          2,542,778
RUBBER DRUM FOR BALL MILLS, PEBBLE
MILLS, AND LIKE MACHINES

Filed Sept. 13, 1945          3 Sheets—Sheet 3

INVENTOR
Frank McIntyre
By Watson, Cole, Grindle & Watson

Patented Feb. 20, 1951

2,542,778

UNITED STATES PATENT OFFICE 2,542,778

RUBBER DRUM FOR BALL MILLS, PEBBLE MILLS, AND LIKE MACHINES

Frank McIntyre, London, England, assignor to Wilkinson Rubber Linatex Limited, London, England Application September 13, 1945, Serial No. 615,951
In Great Britain October 20, 1944

10 Claims. (Cl. 241—66)

Ball mills, pebble mills and like machines for use in grinding ores and ceramic and other materials have a rotary metal tumbler drum, and it has been proposed to line the drums of such machines with rubber for the purpose of protecting the same against abrasion by the contents of the drum and of preventing metallic contamination of the contents of the drum.

Effective bonding and/or anchorage of the rubber lining to the metal drum has however been difficult to achieve because of the tremendous shearing forces to which the lining is subjected in use. Also diffiiulties have arisen due to fatigue or breaking away of the rubber where it contacts with and is secured to the rigid metal surface.

The invention provides a rotary tumbler drum for a ball mill, pebble mill or like machine, comprising a tubular rubber body, mounted in compression between end plates on a number of longitudinally extending rods which connect the end plates and are enclosed within the rubber body. The drum according to the invention thus consists basically of rubber, stiffened by the through-going rods, as distinct from being constituted by a metal body lined with rubber Moreover the rubber, being held in compression, is better able to resist abrasion and cutting than is a rubber lining bonded to an existing metal drum.

The rods and end plates are preferably made of steel or other suitable metal, although nonmetallic materials could be used provided they are of adequate rigidity. The rods are preferably of circular section.

The rubber body is preferably built up of a number of rings threaded on to the rods. The rings may conveniently be held in compression on the rods by means of nuts screwed on to threaded ends of the rods. The rings may be made of sinuous form, either at their external or at their internal periphery, the crests of the waved formation lying opposite the rods so that the effective thickness of the rubber is substantially equal throughout the periphery of the drum.

While a drum in which the body, apart from the rods, consists wholly of rubber is suitable for small s'zed mills, it is necessary for larger mills to employ drums in which the rubber rings are interleaved with metal rings which are also threaded on the rods and project externally beyond the rubber rings. These metal rings serve as cooling fins to conduct heat away from the rubber. They also serve to stiffen the drum against torsion and to support the rods against bending. The internal diameter of the metal rings is generally greater than that of the rubber rings, the inner edges of the metal rings being maintained out of contact with the contents of the drum, for example, by reason of the rubber rings on either side shielding the metal by virtue of their compression.

The fins may be connected by a system of wires, rods, or bars running helically around the outer surface of the drum, external to the rubber and connected to the end plates, to provide a further bracing against torsion. Alternatively, or in addition, tapering metal plates extending longitudinally from and tapering in width from the end plate at the driven end of the drum to the other end plate and external to the rubber and fins may be used as a torsion bracing.

The metal end plates will, in general, be provided with an internal lining of rubber bonded to the metal and held down by special burred washers.

Figure 4:
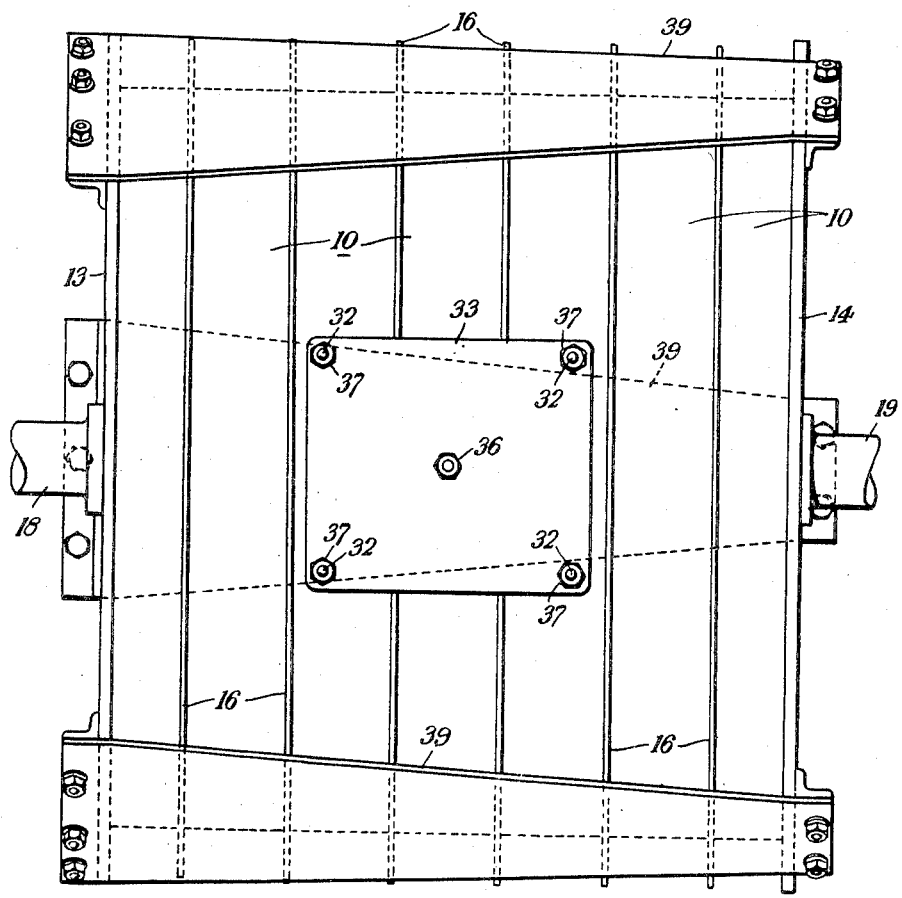
Figure 5:
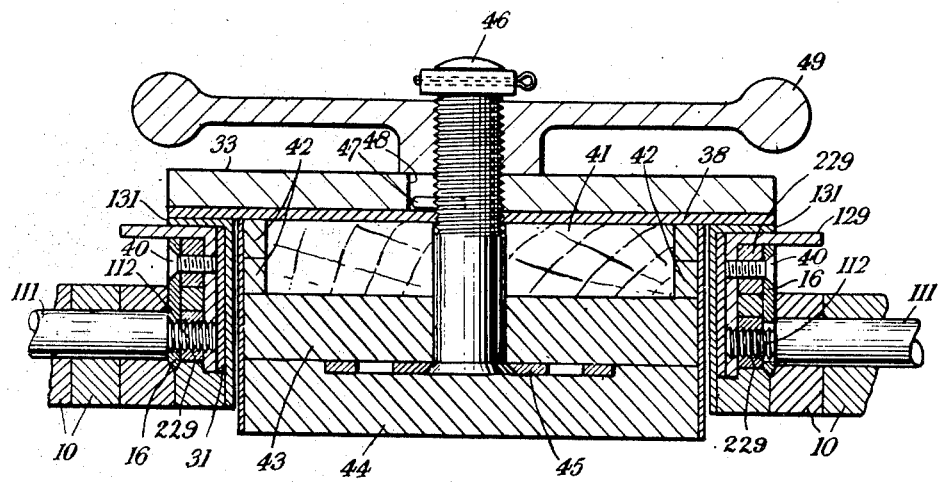
Figure 6:
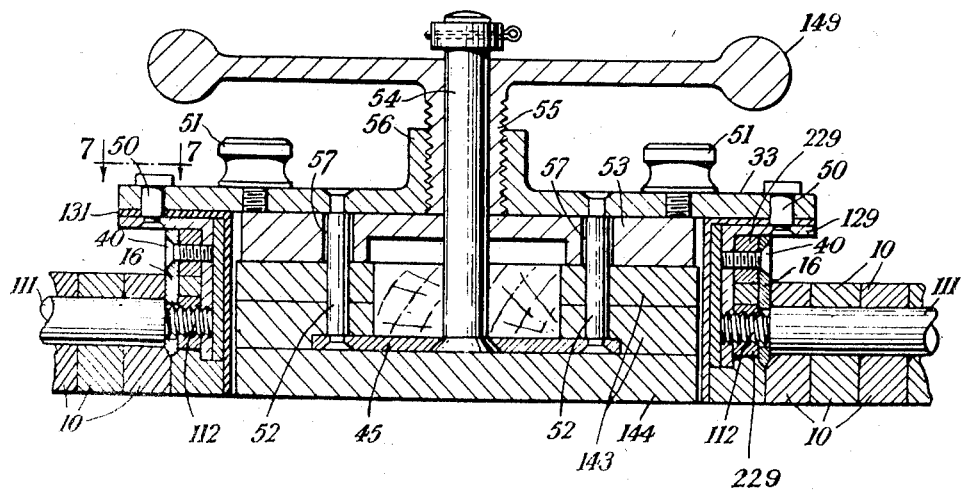
Figure 7:
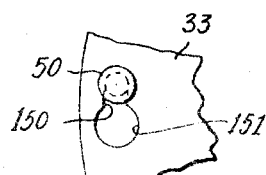

Some alternative form of tumbler drums according to the invention will now be described in more detail with reference to the accompanying drawings, in which, Fig. 1 is a side elevation, partly in section of the first form, Figs. 2 and 3 are respectively sections on lines II—II and III—III in Fig. 1, Fig. 4 is a side elevation of the second form of drum, Figs. 5 and 6 are enlarged sectional views, similar to Fig. 4, showing alternative constructions of inspection cover, and Fig. 7 is a detail view looking in the direction of the arrow X in Fig. 6.

Like reference characters designate like parts throughout the figures.

Referring first to Figs. 1–3, the body of the drum comprises a number of rubber rings 10 threaded on to longitudinally extending and circumferentially spaced metal rods 11. These rods have threaded ends 12 accommodated in holes in metal end plates 13, 14, and nuts 15 screwed on to the threaded ends 12 of the rods maintain the rubber rings 10 in compression. Between consecutive rubber rings are located metal rings 16, which are also threaded on the rods 11 and which extend beyond the outer periphery of the rubber rings to serve as cooling fins. The metal rings 16 are of larger internal diameter than the rubber rings 10, so their inner edges are shrouded and so maintained out of contact with the contents of the drum by reason of the compression of the rubber rings as shown in Fig. 1. As shown in Fig. 2, the rubber rings 10 are of sinuous form at their internal periphery, the crests 17 of their undulations lying opposite the rods 11 so that the effective thickness of the rubber rings is constant throughout their periphery.

The end plates 13, 14 carry respectively trunnions 18, 19 to be accommodated in bearings in the ball mill or the like and trunnion 18 serves to transmit the drive to the drum.

The metal plates 16 serve to stiffen the drum against torsion and to support the rods 11 against bending. Further torsion bracing is provided by wires 20 extending helically around the outer surface of the drum, the wires being attached at their ends to the end plates as indicated at 21 and passing through holes 22 (Fig. 2) in the projecting portions of the metal plates 16.

Each of the metal end plates 13, 14 is provided with an internal lining 23 of rubber bonded to the metal by a ply 24 of fabric, and also secured to the metal by buried washers, each of which is constituted by a metal plate 25 carrying a bolt 26 having a countersunk head 27, nuts 28 securing the bolts to the end plates.

A loading and inspection aperture is provided, this being defined by a rectangular angle iron framework 29 (Figs. 2 and 3). The rubber and metal rings are cutaway, as indicated, to accommodate this framework, and one of the rods 111 is interrupted, its ends 112 being threaded into opposite members of the framework 29. Welded to the framework are two bars 30, which are threaded over the interrupted rod 111 and over the two adjoining rods 11 as shown in Fig. 1. The framework 29 carries an internal rubber lining 31 and four upstanding bolts 32. A cover for the aperture is provided, this being constituted by a metal plate 33, having holes to fit over the bolts 32 and carrying an internal rubber lining 34 consisting of three pads of rubber, the uppermost of which is secured by a buried washer 35 and nut 36 to the metal plate. The cover is held down by nuts 37 fitted to the bolts 32 and two layers 38 of rubber mounted between the metal plate 33 and the upper rubber pad 34 bed down on to the top of the framework 29 to form a tight joint.

The drum shown in Fig. 4 is in every respect similar to that of Figs. 1-3, except that the torsion bracing wires are replaced by tapering metal plates 39 external to the drum, which extend longitudinally and are fixed at their opposite ends to the end plates, the plates 39 tapering in width from the end plate 13 at the driven end of the drum to the end plate 14 at the other end.

In Figs. 5 and 6 are shown alternative forms of inspection aperture. In both cases the aperture is circular and the cover is constituted by a plug which can be introduced into position and removed by manipulation of a hand-wheel. The operation of removing or replacing the cover can thus be effected more rapidly than in the case of Fig. 3, where four nuts 37 have to be dealt with.

Considering first of all Fig. 5, the inspection aperture is defined by a circular metal frame 129, to which are attached packing pieces 229 and into which the threaded ends 112 of the interrupted rod 111 are screwed. The frame 129 is secured to the metal rings 16 nearest the aperture by screws 40 introduced into the packing pieces 229, and has an internal rubber lining 31.

The cover comprises, as before, a metal plate 33 having an underlying layer 38 of rubber which, in this case, beds down on a rubber strip 131 bonded to the frame 129 and lining 31. Beneath the rubber layer 38 is a wooden plug 41 shrouded in rubber 42 and two rubber discs 43, 44, all the constituent parts of the cover plug being bonded together. Attached to the rubber disc 44 by a buried washer 45 is a bolt 46 held against rotation in relation to the plate 33 by a key 47 engaging in a keyway 48 in the plate. A handwheel 49 is fitted to the threaded end of the bolt 46. On screwing down the hand-wheel 49, the bolt 46 will lift in relation to the metal plate 33 and expand the rubber disc 43 into binding engagement with the framework 39.

The arrangement of Fig. 6 is generally similar, so far as the inspection aperture is concerned. Pins 50 projecting upwardly from the frame 129 engages in keyhole slots 150 (Fig. 7) in the metal top plate 33 of the cover plug, which, after engaging the enlarged parts 151 of the slots with the pins 50, requires turning by means of the bosses 51 to bring the pins out of register with said enlarged parts 151. Beneath the metal plate 33 and held thereto by rivets 52, are a metal compression plate 53 and a pair of rubber discs 143. A buried washer 45 supports an upstanding pin 54, and an inner layer 144 of rubber is bonded to the underside of the plug. The handwheel 149 has an externally threaded portion 55 engaging in a threaded boss 56 on the plate 33. When the hand-wheel 149 is screwed down the compression plate 53 is forced downwardly to expand the rubber discs 143 into binding engagement with the framework 129. It will be noticed that the rivets 52 pass with clearance through holes 57 in the compression plate, thus enabling the compression plate to move up or down in relation to the top plate 33.

Any desired type of rubber, either natural or synthetic, may be used in the construction of the drum according to the invention, but I prefer to employ, because of its especially high resistance to abrasion, the material manufactured by the process described in British Patent No. 437,928, i. e. by incorporating in latex a vulcanising ingredient, such as sulphur, and an accelerator, coagulating the mixture, separating the coagulum from the residual liquor, preparing crepe or sheet rubber from the coagulum, drying the rubber under conditions such that substantially no vulcanisation takes place, and thereafter effecting very slow vulcanisation of the dry rubber, the period of vulcanisation extending from one or two weeks to several months. Another form of rubber having a high degree of resistance to abrasion and particularly suitable for my purpose is that made by the process described in U. S. Patent No. 2,358,195.

Tumbler drums constructed in accordance with the invention are suitable for use in concrete mixing machines, in place of the usual metal drums. In this case, the rubber will not only act to resist abrasion but also to reduce the tendency of the material to cake. They are also capable of use where chemicals are present which corrode metal but do not attack rubber.

What I claim as my invention and desire to secure by Letters Patent is:

1. A rotary tumbler drum, comprising a pair of end plates, a plurality of longitudinal rods extending between and connecting said end plates, and a tubular body portion comprising a plurality of rubber rings and metal stiffening rings disposed between certain adjacent rubber rings at least, said rubber and metal rings being threaded on said rods and held in compression between said end plates, and said metal rings projecting externally beyond said rubber rings to constitute cooling fins.

2. A drum as claimed in claim 1, in which the metal rings are of greater internal diameter than the rubber rings, their inner edges being shrouded by the compressed rubber rings.

3. A rotary tumbler drum, comprising a pair of end plates, a plurality of longitudinal rods extending between and connecting said end plates, a tubular body portion comprising a plurality of rubber rings and metal stiffening rings disposed between certain adjacent rubber rings at least, said rubber and metal rings being threaded on said rods and held in compression between said end plates, and said metal rings projecting externally beyond said rubber rings to constitute cooling fins, and torsion bracing members extending helically round the drum through holes in the projecting portions of the metal rings, said bracing members being connected to said end plates.

4. A rotary tumbler drum, comprising a pair of end plates, a plurality of longitudinal rods extending between and connecting said end plates, a tubular body portion comprising a plurality of rubber rings and metal stiffening rings disposed between certain adjacent rubber rings at least, said rubber and metal rings being threaded on said rods and held in compression between said end plates, and said metal rings projecting externally beyond said rubber rings to constitute cooling fins, and torsion bracing plates extending longitudinally of the drum and connected to the end plates, said bracing plates tapering in width from one end of the drum to the other.

5. A drum as claimed in claim 1, having a loading and inspection aperture defined by a framework held mounted in the body of the drum, the metal and rubber rings being cutaway locally to accommodate said framework, and a removable cover plug to fit in said framework.

6. A drum as claimed in claim 1, having a loading and inspection aperture defined by a framework held mounted in the body of the drum, the metal and rubber rings being cutaway locally to accommodate said framework, and a removable cover plug to fit in said framework, said cover plug comprising at least one rubber disc and a screw operable for expanding said rubber disc into binding engagement with said aperture-defining framework.

7. A rotary tumbler drum, comprising a pair of end plates, a tubular rubber body held in axial compression throughout its entirety between said end plates, and a plurality of continuous longitudinal members embedded in said rubber body and connecting said end plates, said members serving to stiffen said rubber body and to hold the same in axial compression.

8. A rotary tumbler drum, comprising a pair of end plates, a tubular rubber body for retaining contained material within the drum, said body having an uninterrupted interior rubber surface and a plurality of longitudinal rods extending throughout its entirety between and connecting said end plates, said rubber body being mounted in axial compression between said end plates and said rods being enclosed within said rubber body and serving to stiffen said body and to hold the same axially compressed.

9. A rotary tumbler drum, comprising a pair of end plates, a tubular rubber body and a plurality of longitudinal rods extending between and connecting said end plates, said body being constituted by a plurality of rubber rings, which abut against one another to provide a continuous rubber surface throughout the whole interior of the body, which are threaded on said rods and which are held in compression between said end plates.

10. A rotary tumbler drum, comprising a pair of end plates, a plurality of longitudinal rods extending between and connecting said end plates, a tubular body portion comprising a plurality of rubber rings and metal stiffening rings disposed between certain adjacent rubber rings at least, said rubber and metal rings being threaded on said rods and held in compression between said end plates, and said metal rings projecting externally beyond said rubber rings to constitute cooling fins, and bracing members external to the body portion and connecting the end plates.

FRANK McINTYRE.

REFERENCES CITED

The following references are of record in the file of this patent:

UNITED STATES PATENTS

| Number | Name | Date |
| --- | --- | --- |
| 536,112 | Western | Mar. 19, 1895 |
| 673,768 | Fleming | May 7, 1901 |
| 1,238,652 | Ensign | Aug. 28, 1917 |
| 1,249,764 | Johnson | Dec. 11, 1917 |
| 1,601,956 | Gammeter | Oct. 5, 1926 |
| 1,607,828 | Holthoff | Nov. 23, 1926 |
| 1,907,785 | Garlick | May 9, 1933 |
| 1,921,672 | Haushalter | Aug. 8, 1933 |
| 2,122,399 | Abbe | July 5, 1938 |

OTHER REFERENCES

Engineering and Mining Journal, Press, September 1924, vol. No. 12, page 476, McGraw-Hill Co. Inc., 10th Avenue at 36th Street, New York city.